No. 830,185. PATENTED SEPT. 4, 1906.
H. I. SMITH & C. H. FISHER.
POTATO DIGGER.
APPLICATION FILED APR. 4, 1905.

3 SHEETS—SHEET 1.

Witnesses:
E. A. Volk.
R. W. Ramser.

Inventors
H. I. Smith
C. H. Fisher
By Wilhelm Parker Hand
Attorneys.

No. 830,185. PATENTED SEPT. 4, 1906.
H. I. SMITH & C. H. FISHER.
POTATO DIGGER.
APPLICATION FILED APR. 4, 1905.

3 SHEETS—SHEET 2.

Witnesses:—
E. A. Volk.
R. W. Remser.

H. I. Smith
C. H. Fisher
Inventors

J. Wilhelm, Parker & Hard
Attorneys.

No. 830,185. PATENTED SEPT. 4, 1906.
H. I. SMITH & C. H. FISHER.
POTATO DIGGER.
APPLICATION FILED APR. 4, 1905.
3 SHEETS—SHEET 3.
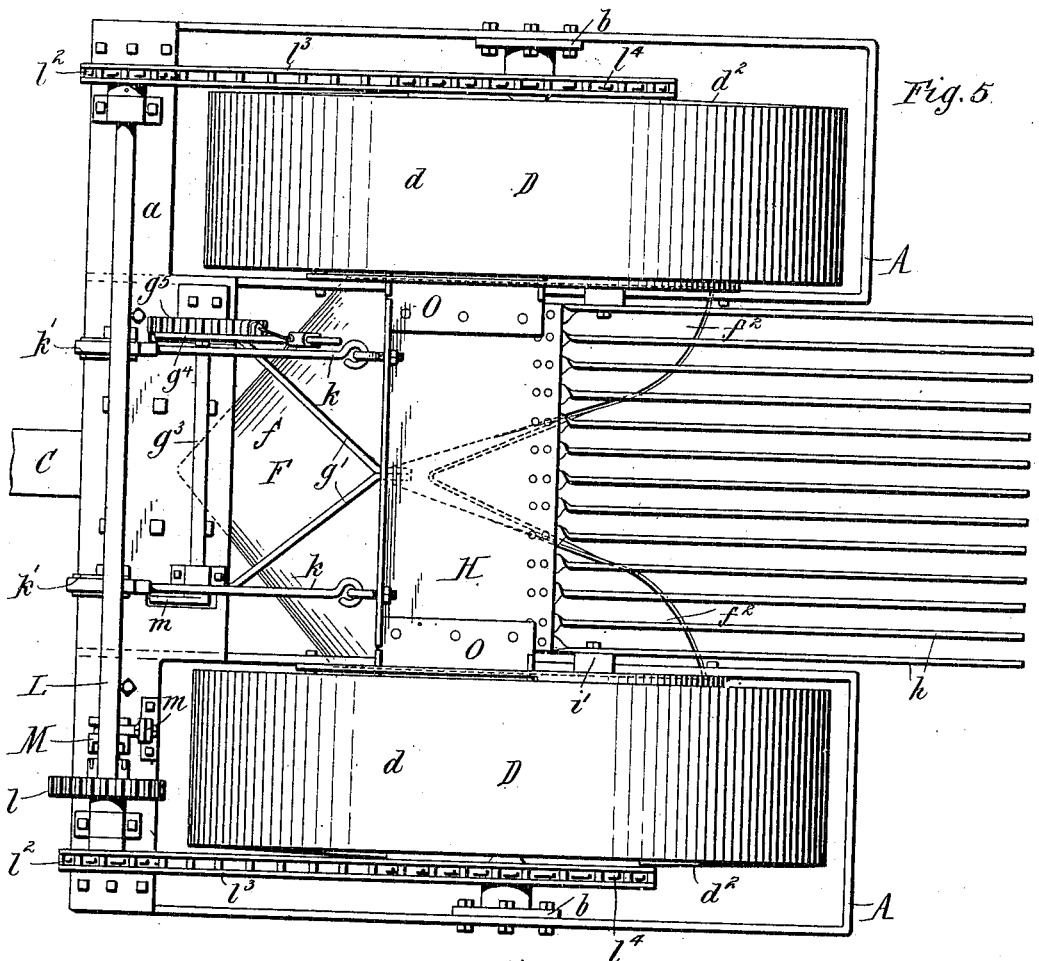
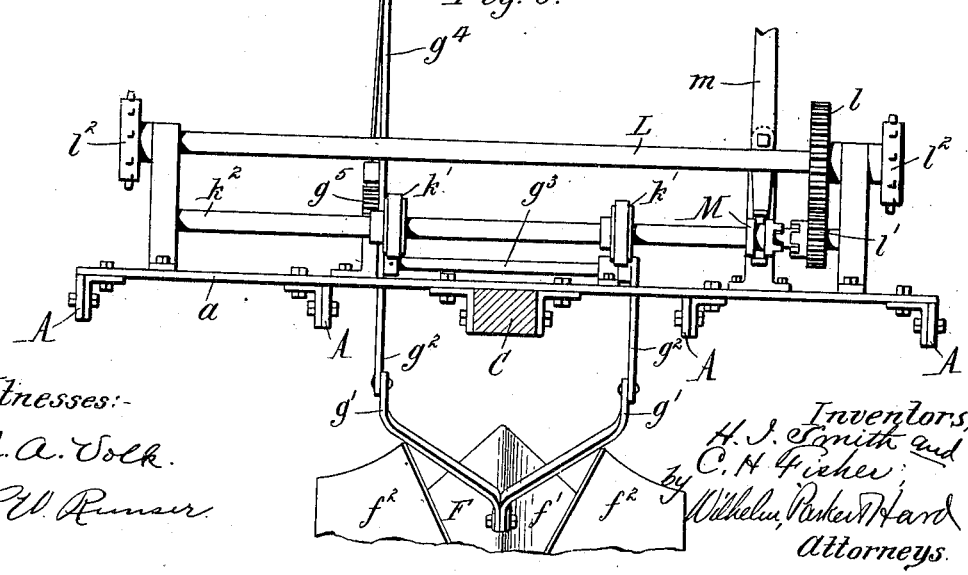
Witnesses:-
E. A. Volk.
R. W. Rumser.
Inventors,
H. I. Smith and
C. H. Fisher,
by Wilhelm, Parker & Hard
Attorneys.

UNITED STATES PATENT OFFICE.

HENRY I. SMITH AND CHARLES H. FISHER, OF BLISS, NEW YORK.

POTATO-DIGGER.

No. 830,185.  Specification of Letters Patent.  Patented Sept. 4, 1906.

Application filed April 4, 1905. Serial No. 253,822.

*To all whom it may concern:*

Be it known that we, HENRY I. SMITH and CHARLES H. FISHER, citizens of the United States, residing at Bliss, in the county of Wyoming and State of New York, have invented a new and useful Improvement in Potato-Diggers, of which the following is a specification.

This invention relates to potato-diggers of that kind comprising a shovel or plow for breaking and turning up the earth and potatoes, a shaking separator or screen for separating the potatoes from the earth and discharging the potatoes over the rear end of the separator as the machine is drawn along the row, and one or more hollow wheels located adjacent to the plow or shovel and having internal elevating flights or devices to receive the earth and potatoes from the plow and lift and deposit the same on the shaking separator.

The objects of the invention are to provide a light-draft potato-digger of this type adapted for use in stony ground, which is so constructed that the stones and potatoes cannot wedge in between the plow and elevating wheel or wheels, so as to clog the machine and increase its draft or impede its operation or bruise the potatoes; to insure a complete separation of the potatoes from the earth and rubbish by elevating the material to a suitable height above the separator and discharging it upon the separator, so as to thoroughly break up and agitate the earth; to provide suitable shields which insure the proper elevation of the material and prevent the escape of the same from the elevating-wheels except onto the separator, and to improve the construction of this type of machines in the respects hereinafter specified, and set forth in the claims.

Figure 1:
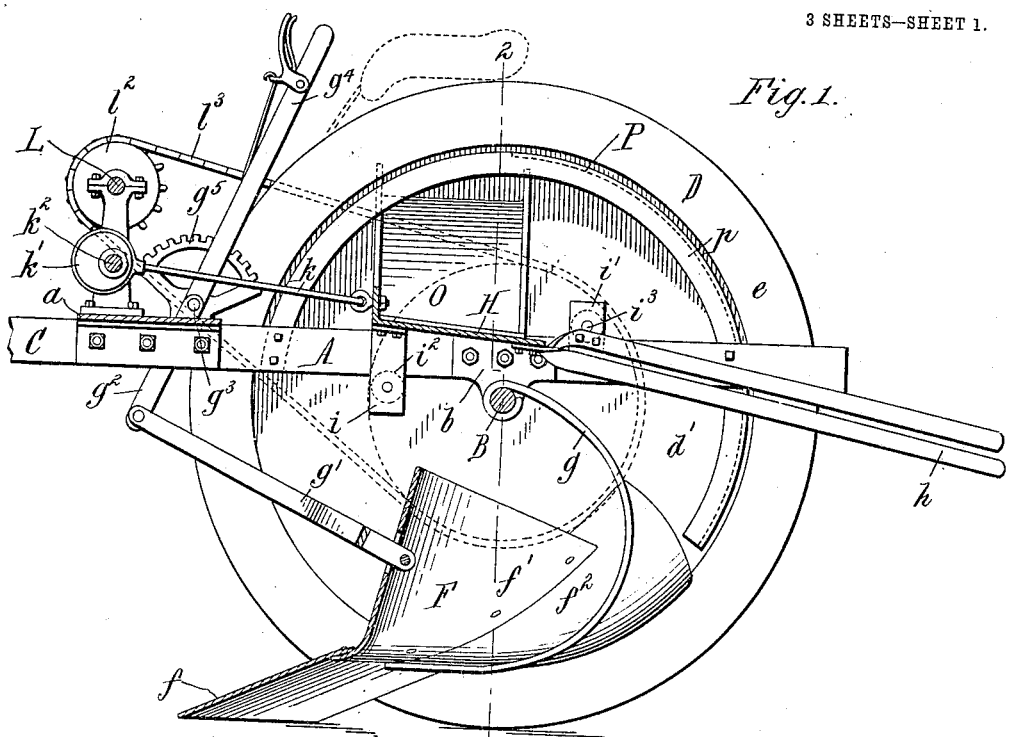
Figure 2:
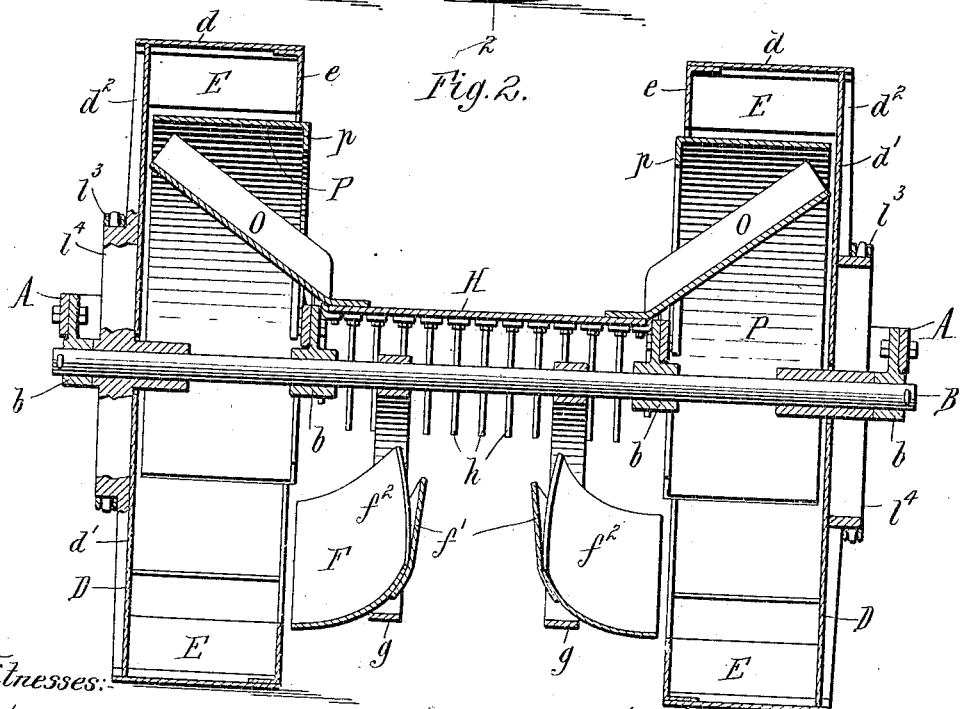
Figure 3:
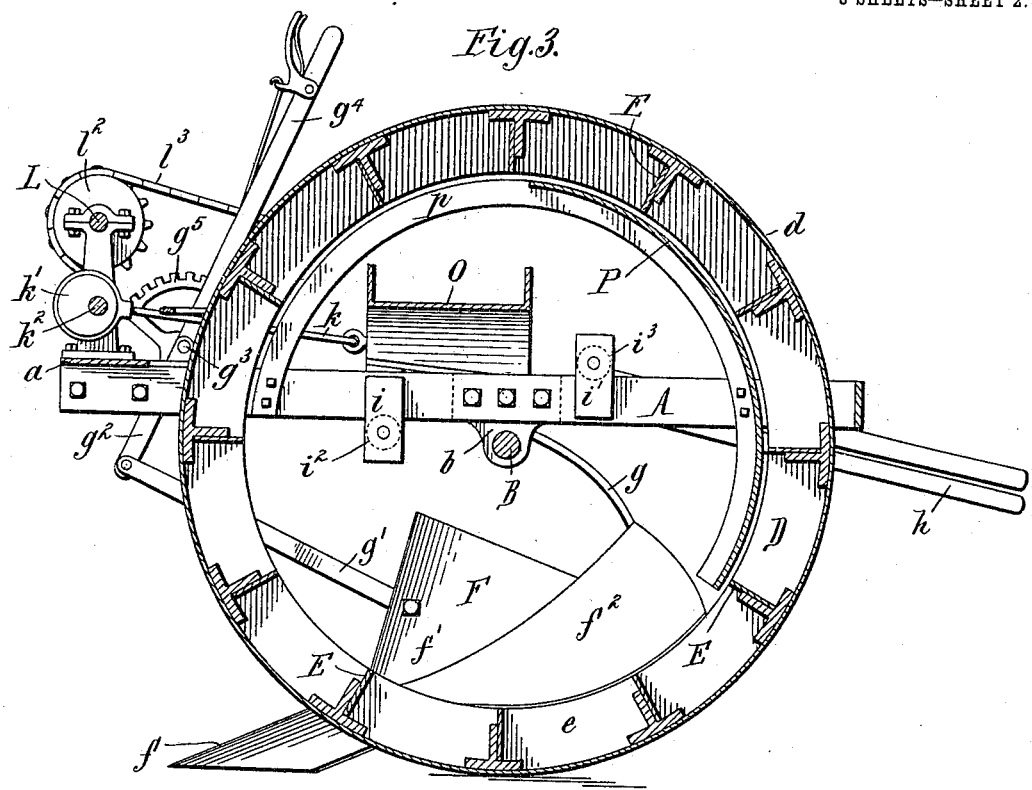
Figure 4:
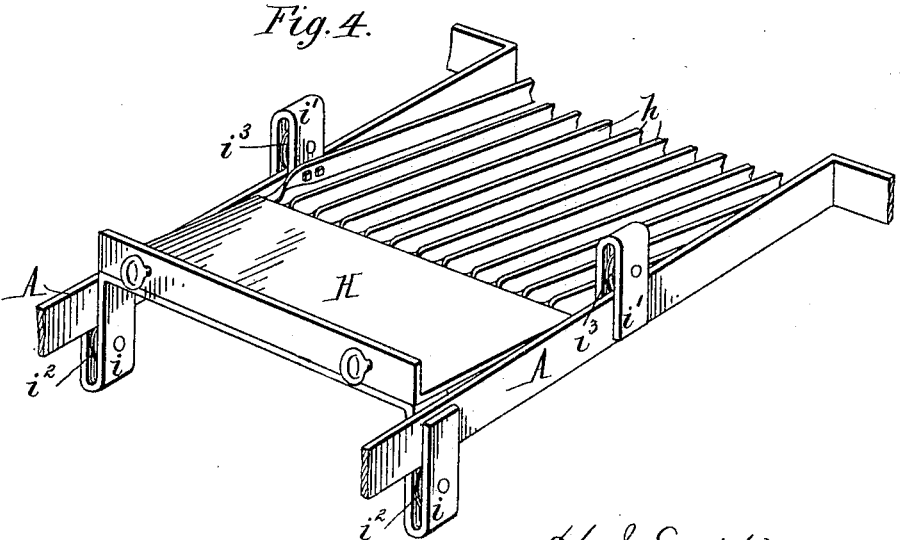

In the accompanying drawings, consisting of three sheets, Figure 1 is a longitudinal sectional elevation of a potato-digger embodying the invention. Fig. 2 is a transverse sectional elevation in line 2 2, Fig. 1, thereof looking toward the rear. Fig. 3 is a sectional elevation thereof through one of the ground-wheels looking toward the center of the machine. Fig. 4 is a fragmentary perspective view of the shaking separator and its supports. Fig. 5 is a plan view of the machine. Fig. 6 is a fragmentary front elevation of the drive mechanism for the separator.

Like letters of reference refer to like parts in the several figures.

The main frame of the machine may be of any suitable construction. The frame shown in the drawings consists of two separated rectangular wheel-frames A, connected at their front ends by a transverse platform or bar $a$ and between their ends by a horizontal shaft or axle B, passing through bearings $b$, secured to the side bars of the wheel-frame. The frame may be of any other suitable construction.

C represents the usual draft pole or device.

D represents the ground-wheels, which are mounted on the axle and support the frame and other parts of the machine. The wheels are hollow, having wide rims $d$ connected at their outer edges to the central hubs, so as to leave unobstructed wide annular spaces between their rims and the axle. The wheels shown are provided at their outer sides with plates or disks $d'$, which may be, and preferably are, reinforced by spokes $d^2$, Fig. 2. Each wheel is provided at the inner edge of its rim with an annular vertical flange $e$ and between the latter and the plate at its outer side with a series of elevating devices, preferably consisting of flights, blades, or the like E, which are arranged transversely and extend radially inward from the rim of the wheel a distance equal substantially to the width of the flange $e$. The flights, with the plate and flange, form an annular series of elevating-pockets, which receive the earth and potatoes from the plow and convey the same to the separator, as will be described. The rims of the wheels are preferably solid, so that all of the material thrown into the wheels is retained therein and elevated.

F represents the shovel, plow, or scoop for breaking and lifting or turning up the earth and potatoes. The shovel is located between the elevating-wheels and is preferably shaped substantially as shown. It has a cutting toe or point $f$, which is provided with a substantially horizontal V-shaped cutting edge and inclines upwardly and rearwardly to a height substantially equal to or somewhat greater than that of the flanges $e$ of the wheels. A substantially upright central V-shaped part $f'$ rises from the rear central portion of the toe, and this upright central portion and the sides of the toe or point $f$ are joined by curved wings $f^2$, which flare rearwardly and terminate in side edges which curve in substantial conformity to the inner edges of the flanges $e$ of the wheels, as shown in Fig. 3. The side edges of the toe and wings of the shovel extend close to the inner sides of the wheels and are substantially parallel throughout their length with the vertical planes of the flanges $e$ of the wheels, so that there is but little possibility of the potatoes, or stones of any size, wedging in between the shovel and the wheels, with the result, on the one hand, of bruising or mashing the potatoes or, on the other hand, of clogging and stopping or greatly increasing the draft of the machine. The shape of the shovel is such that the earth and potatoes are lifted above the inner edges of the wheel-flanges before they are moved sidewise by the shovel-wings, and as a consequence the material is shoved over and clear of the wheel-flanges into the elevating-pockets of the wheels and not crowded up against the faces of the wheel-flanges. As the side edges of the shovel-wings are close to and parallel with the inner edges of the wheel-flanges, they act as guards to prevent the material from working out of the wheels.

The shovel or plow can be supported from the frame by any suitable means. As shown, it is carried by bars $g$, hung on the axle B, and is braced by rods $g'$, extending forwardly and upwardly and connected at their front ends to arms $g^2$ on a rock-shaft $g^3$, journaled in suitable bearings on the front part of the frame. (See Figs. 1, 3, and 6.) Fixed to the rock-shaft $g^3$ is a hand-lever $g^4$ for rocking it to raise and lower the shovel, and suitable means, such as a toothed segment $g^5$ on the frame and a coöperating releasable dog on the lever, are provided for holding the lever and the shovel to which it is connected in different desired positions. Other supporting and operating means for the shovel or plow could be employed.

The shaking separator or screen is arranged between the wheel-frames A above the shovel or plow and preferably consists of a solid or imperforate front plate or portion H and spaced longitudinal separating bars or tines $h$, which are secured to and extend rearwardly and preferably downwardly from said front plate or portion. The separator is movably supported to reciprocate horizontally back and forth by some means which affords a free easy movement of the separator. Desirable supporting means are shown consisting of a front pair of guide-hooks $i$, which depend from the front corners of the separator and engage under the inside bars of the wheel-frames, and a rear pair of guide-hooks $i'$, which engage over the bars of the wheel-frames. The two pairs of guide-hooks are provided with antifriction-rollers $i^2$ $i^3$, which bear, respectively, against the lower and upper edges of the supporting-bars and reduce the friction in the operation of the separator.

The separator is reciprocated by suitable mechanism, such as pitmen $k$, connected at their rear ends to the front end of the separator and provided at their front ends with straps encircling eccentrics $k'$ on a shaft $k^2$, journaled transversely of the machine in suitable bearings on the front part of the frame. The eccentric-shaft is driven by gears $l$ $l'$ from a parallel counter-shaft L, which is journaled in suitable bearings on the frame and is provided at its ends with sprocket-wheels $l^2$, connected, by sprocket-chains $l^3$, with sprocket-wheels $l^4$, connected to and turned by the ground-wheels. The shaking separator can be thrown into and out of action by any ordinary means, such, for instance, as a clutch M, Figs. 5 and 6, operated by a lever $m$ for coupling the eccentric-shaft to and uncoupling it from its gear-wheel $l'$. The drive mechanism for the separator forms no part of the invention, and any known or suitable drive means can be used.

O represents chutes or trough-shaped lateral extensions of the separator, which extend upwardly from the sides of the front end of the separator into the ground-wheels beneath the path of the elevating-pockets to receive the earth, potatoes, and other material from the inverted pockets and direct the same down onto the separator. Chutes stationarily mounted independently of the separator might be employed; but the construction shown is preferable, because the shaking chutes violently agitate the earth as it descends therein, thus thoroughly breaking it up and also facilitating its descent onto the separator.

Curved shields P, Figs. 1, 2, and 3, are provided to prevent the material from escaping out of the elevating-pockets of the wheels D before they reach a position over the separator-chutes, such as to properly discharge all of their contents into the chutes. The shields extend laterally into the hollow wheels from their inner sides nearly to the plates at the outer sides and extend circumferentially from points near the rear ends of the wings of the shovel or plow upwardly and forwardly to points over the separator-chutes. They are separated from the inner edges of the flights and flanges of the elevating-wheels by spaces too narrow to allow the potatoes and earth to escape from the elevating-pockets and slide down the shields. The shields are stationarily supported by curved bars $p$, secured at opposite ends to the inner bars of the wheel-frames, or in any other convenient manner.

The operation of the machine is as follows: As the machine is drawn along the row the shovel or plow digs into and scoops up the earth, potatoes, vines, &c., dividing them into two parts, which are directed by the upright central and wing portions of the shovel toward the elevating-wheels. The greater part, or at least a considerable portion, of the long vines and weeds are turned to the sides beneath and rolled down by the wheels and do not enter the latter. The earth and potatoes are lifted clear of the flanges of the wheels and shoved over the same into the elevating-pockets. The pockets carry the material up over the shields P, dropping it over the front ends of the shields into the chutes O, down which it slides onto the shaking separator H. The shields P prevent the material from falling out of the elevating-pockets as they ascend and enable it to be lifted to a point considerably above the separator before it is discharged, so that the material is suddenly precipitated onto the separator and the earth well broken up, enabling a thorough and ready separation of the potatoes therefrom. The separator H, as usual, sifts out the earth which falls through the spaces between the separator-bars, while the potatoes and the vines, weeds, &c., that were elevated to the separator pass rearwardly over the latter and drop on the ground.

Preferably the potato-digger has the two elevating-wheels and the shovel or plow for dividing and directing the material into both wheels; but manifestly a single wheel with a shovel having the described characteristics for throwing the material into the wheel could be employed.

We claim as our invention—

1. In a potato-digger, the combination of a wheel for elevating the earth and potatoes to the separator, said wheel having a broad imperforate rim, an upright annular flange extending toward the center of the wheel from the inner edge of said rim, and elevating devices within said wheel, a shovel provided with a digging portion which inclines upwardly and rearwardly and which has a side edge parallel with and in close proximity to the upright flange of the wheel, and a separator, substantially as set forth.

2. In a potato-digger, the combination of wheels for elevating the earth and potatoes to the separator, said wheels having imperforate rims, upright annular flanges extending toward the center of the wheels from the inner edges of said rims, and elevating devices within said rims, a shovel between said wheels extending practically from one wheel to the other and provided with a digging portion which inclines upwardly and rearwardly and has side edges parallel with and in close proximity to said upright flanges of the wheels, and a separator, substantially as set forth.

3. In a potato-digger, the combination of an elevating-wheel having a broad substantially flat imperforate rim, an upright annular flange extending toward the center of the wheel from the inner edge of said rim, and elevating flights within said rim, a shovel provided with an upwardly and rearwardly inclined portion having a side edge parallel with and close to the plane of said upright wheel-flange for lifting the earth and potatoes up to the inner edge of said flange and a portion for moving the earth and potatoes over said flange into the wheel, and a separator to which said wheel lifts the earth and potatoes, substantially as set forth.

4. In a potato-digger, the combination of a wheel having a rim, elevating devices within said rim, and an annular flange extending inwardly from said rim, a shovel provided with an inclined toe for lifting the earth and potatoes up to the inner edge of said flange and a flaring wing having a side edge parallel with the plane of said wheel-flange and curved substantially parallel with the inner edge of said flange, and a separator to which said wheel lifts the earth and potatoes, substantially as set forth.

5. In a potato-digger, the combination of a wheel having a solid rim, internal elevating devices, and a substantially upright flange at its inner side extending toward the center of the wheel, a shovel for throwing the earth and potatoes into said wheel having a rear and potatoes into said wheel having a rearwardly-extending portion with an edge adjacent to and substantially parallel with the inner edge of said flange of the wheel, a shaking separator, and a stationary curved shield within said wheel adjacent to the inner edge of said flange and to the path of said elevating devices and extending from a point adjacent to the rear end of the shovel to a point over said separator, substantially as set forth.

Witness our hands this 27th day of February, 1905.

HENRY I. SMITH.
CHARLES H. FISHER.

Witnesses:
Geo. H. Drake,
Clair D. Warren.